US008077904B2

(12) United States Patent
Dixit (10) Patent No.: US 8,077,904 B2
(45) Date of Patent: Dec. 13, 2011

(54) APPARATUSES, COMPUTER PROGRAM PRODUCTS, AND METHODS FOR AUTHENTICATING DIGITAL SIGNALS

(75) Inventor: Amitabh Dixit, Dallas, TX (US)

(73) Assignee: Nokia Corporation, Espoo (FI)

( * ) Notice: Subject to any disclaimer, the term of this patent is extended or adjusted under 35 U.S.C. 154(b) by 1334 days.

(21) Appl. No.: 11/479,683

(22) Filed: Jun. 30, 2006

(65) Prior Publication Data

US 2008/0002852 A1    Jan. 3, 2008

(51) Int. Cl.
*G06K 9/00* (2006.01)
(52) U.S. Cl. ........ 382/100; 382/181; 382/224; 714/704; 714/799
(58) Field of Classification Search .................. 370/389; 375/130, 240.19, 241, 242, 253, 353, 354; 380/28, 202, 210; 382/100, 245, 246, 247; 386/95; 704/205; 709/225; 713/169, 176, 713/193; 714/758, 784, 795
See application file for complete search history.

(56) References Cited

U.S. PATENT DOCUMENTS

| 6,094,722 A | 7/2000 | Astola et al. |
| 6,263,087 B1 * | 7/2001 | Miller ........................... 382/100 |
| 6,714,683 B1 | 3/2004 | Tian et al. |

OTHER PUBLICATIONS

Choi et al., "Watermark detection based on error probability and its applications to video watermarking", 2004, Electronics and Communications in Japan (Part III: Fundamental Electronic Science), vol. 87 Issue 6, pp. 66-76.*
Baitello et al. "From watermark detection to watermark decoding: a PPM approach", Elsevier Signal Processing, 2001, vol. 81, pp. 1261-1271.*
A. Dixit and G. C. Orsak, "Optimal empirical detector fusion," presented at the IEEE Signal ProcessingWorkshop, Hunt, TX, Oct. 15-18, 2000.*
Raymond B. Wolfgang and Edward J. Delp; *A Watermark for Digital Images*; IEEE; 1996; pp. 219-222.
R.G. Van Schyndel, A.Z. Tirkel and C.F. Osborne; *A Digital Watermark*; IEEE; 1994; pp. 86-90.
Ingemar J. Cox, Joe Kilian, F. Thomson Leighton and Talal Shamoon; *Secure Spread Spectrum Watermarking for Multimedia*; IEEE Transactions on Image Processing; Dec. 1997; pp. 1673-1687; vol. 6, No. 12.
Amitabh Dixit and Geoffrey C. Orsak; *Optimal Empirical Detector Fusion*; pp. 1-6 IEEE; Oct. 15-18, 2000.
Amitabh Dixit, Scott C. Douglas and Geoffrey C. Orsak; *Blind Estimation of Channel BERS in a Multi-Receiver Network*; IEEE; 2004; pp. II-305-II-308.
Deepa Kundur and Dimitrios Hatzinakos; *Improved Robust Watermarking Through Attack Characterization*; OSA; Dec. 7, 1998; vol. 3, No. 12; Optics Express 485.

(Continued)

*Primary Examiner* — Sath V Perungavoor
*Assistant Examiner* — Jason Heidemann
(74) *Attorney, Agent, or Firm* — Alston & Bird LLP (57) ABSTRACT

Apparatuses, computer program products, and methods for authenticating digital signals are provided in which copies of a watermark are extracted from a digital signal with at least some of the copies potentially having distorted values. The original values of the watermark may be reconstructed exclusively based on the extracted copies of the watermark. The method includes estimating one or more bit error rates without training or reference information. The bit error rates are modeled as being equivalent to transmitting the copies through binary symmetric channels. The estimated bit error rates and the distorted values are combined to reconstruct the original values of the watermark. The reconstructed watermark may be compared to an original watermark for authenticating the received digital signal. Also, the estimated bit error rates may be compared to a random sequence of bits for verifying the presence of the watermark without knowing the original values of the watermark.

41 Claims, 7 Drawing Sheets

OTHER PUBLICATIONS

Paul Flikkema; *Spread-Spectrum Techniques for Wireless Communication*; IEEE Signal Processing Magazine; May 1997; pp. 26-36.

Deepa Kundur, Dimitrios Hatzinakos and Henry Leung; *Robust Classification of Blurred Imagery*; IEEE Transactions on Image Processing; Feb. 2000; pp. 243-255; vol. 08, No. 2.

Deepa Kundur; *Multimedia and Security—Watermarking with Diversity: Insights and Implications*; IEEE; 2001; pp. 46-52.

Amitabh Dixit and Geoffrey C. Orsak; *Asymptotically Optimal Blind Fusion of Bit Estimates*; IEEE; 2002; pp. 377-382.

* cited by examiner

APPARATUSES, COMPUTER PROGRAM PRODUCTS, AND METHODS FOR AUTHENTICATING DIGITAL SIGNALS

FIELD OF THE INVENTION

Embodiments of the present invention relate generally to signal authentication technology and, more particularly, relate to methods, apparatuses, and computer program products for embedding and decoding digital watermarks within digital signals.

BACKGROUND OF THE INVENTION

Information and multimedia services today are predominantly published and distributed in a digital format rather than an analog format. The reasons for the shift to digital formats include the ease and economy at which digital content can be distributed. However, digital content providers face a constant threat of unauthorized copying and distribution of their digital content.

Techniques have been developed to help protect digital content from unauthorized or pirated use. The techniques include systems for encrypting and/or authenticating the digital content. One example of authentication is the use of digital watermarks. Digital watermarking is the process of inserting one or more sequence of bits, called watermarks, into a digital file or signal, referred to as the host signal. The watermarks may be used to carry information about the host signal, including authorship and ownership. Moreover, the watermarks or lack thereof may be used for authenticating and/or tamper proofing purposes.

A digital watermark may be perceptible or imperceptible. A perceptible watermark is one that alters the host file or signal such that the watermark itself is perceptible to a consumer. For example, the digital watermark may add a copyright notice onto an image that is visible to the consumer. However, the utility of a perceptible watermark is limited.

For example, the visibility of the watermark makes the location of it known to potential attackers which makes it easier for the attackers to remove it. Also, in some applications such as imaging and video, it is undesirable to mar an image or other digital content with a perceptible watermark.

In contrast, because an invisible watermark is imperceptible, its location within the host file or signal is unknown, which in turn makes it harder for someone to remove or alter the watermark. However, an invisible watermark is not immune to attacks, deliberate or otherwise. For example, if a watermark is casually embedded into the host signal it can be distorted or even completely destroyed by simple operations such as cropping or filtering.

"Robust watermarks" have been developed that are capable of withstanding a reasonable degree of attacks. In general, two types of techniques, "spread spectrum" and "diversity based," have been used to develop robust watermarking.

A spread spectrum technique is the insertion of a pseudo-randomly generated sequence of bits, i.e. the watermark, in a host file or signal in either a spatial domain or in a transform domain, e.g., discrete cosine transform (DCT) coefficients or wavelet transform coefficients. Later a digital file or signal may be tested for the presence of the watermark by extracting the bits from the digital signal that correspond to the expected location of the watermark. If the extracted bits correlate with the known or reference watermark sequence to a sufficient degree, that correlation would indicate the presence of the original watermark and the authentication of the digital signal as the host signal.

Although the spread spectrum technique has been effective against some narrow band interference, it has not proven effective for extraction of long watermark sequences due to the high bandwidth requirements. Other known drawbacks associated with the spread spectrum technique include vulnerability to near-far problems and inflexibility to statistical variations in the signal.

A diversity based technique has been proposed to overcome some of the drawbacks of the spread spectrum technique. In general, a diversity based technique involves embedding and extracting multiple copies of two types of watermarks, reference watermarks and robust watermarks. The copies of a reference watermark are used to estimate the robust watermark's reliability. Specifically, the multiple copies of the reference watermark are used to estimate the bit error probabilities or distortion of the extracted reference watermark bits and then the multiple copies of the extracted robust watermark are combined, through linear weighting and the estimated bit error probabilities, to find an overall estimate of the original robust watermark. A high enough correlation value between the original undistorted robust watermark and the overall estimate of the original robust watermark would indicate the presence of the original robust watermark and the authentication of the digital file or signal.

The reliance on two types of watermarks adds to the payload of the signal or increases the size of the file. Also, the diversity based technique makes the assumption that the bit error probabilities for the copies of the reference watermark is the same as the bit error probabilities for the copies of the robust watermark. This assumption may be problematic when localized distortions are introduced to the digital signal that affects one type of watermark more than the other. Furthermore, if a localized attack destroys the reference watermarks but leaves the robust watermark unaltered, the prior art robust watermarking schemes will fail to recover the robust watermark. Hence the efficiency of prior art robust watermarking schemes is not in proportion to the payload embedded within the host signal.

Given the above described limitations and problems, it may be advantageous to provide an improved method, apparatus, and computer program product for embedding and extracting digital watermarks in and out of digital files and signals.

BRIEF SUMMARY OF THE INVENTION

A method, apparatus, and computer program product are therefore provided that allow for the verification of the presence of a watermark within a digital signal based exclusively from a plurality of extracted and potential distorted copies of one type of watermark and without the need of additional training or reference information. The verification may include reconstruction of the original values of the potential distorted copies or comparing bit error rates of the potential distorted copies to a random sequence of bits.

In one exemplary embodiment, a method for an authenticating a digital signal is provided. The method includes extracting more than one potentially distorted copy of a watermark from a digital signal, estimating one or more individual bit location error rates for the potentially distorted copies based exclusively upon the potentially distorted copies and without additional training or reference information, and verifying the presence of the watermark in the digital signal based on the individual bit location error rates. The estimation of the individual bit location error rates may include modeling the individual bit location error rates as being the equivalent to the transmission of copies of the watermark through a number of independent binary symmetric channels. The number of independent binary symmetric channels may equal the number of copies of the watermark. The method may further include fusing the individual bit location error rates into an overall bit error rate for the copies of the watermark. The verification of the presence of the watermark may be based on the difference of the overall bit error rate to 0.5. Or the verification of the presence of the watermark may be based on the difference between the lowest individual bit location error rate to 0.5. The method may further include determining a reconstructed watermark based on the individual bit location error rates and the potentially distorted copies of the watermark. And the verification may be based on the correlation of the reconstructed watermark to an original watermark. Furthermore, the method may include embedding more than one copy of the original watermark into the digital signal. For example, the copies may be uniformly distributed throughout the digital signal. The digital signal may represent a variety of digital content including images, audio recordings, and video recordings. Also, the copies of the watermark may be hidden within the digital signal.

In another exemplary embodiment, a computer program product for authenticating a digital signal is provided. The computer program product may include first, second, and third executable portions stored on a computer-readable medium. The first executable portion may extract more than one potentially distorted copy of a watermark from a digital signal. The second executable portion may estimate one or more individual bit location error rates for the potentially distorted copies based exclusively upon the potentially distorted copies. And the third executable portion may verify the presence of the watermark in the digital signal based on the individual bit location error rates. For example, the computer program product may have a fourth executable portion for determining a reconstructed watermark based on the individual bit location error rates and the potentially distorted copies of the watermark and a fifth executable portion for correlating the reconstructed watermark to the original watermark for authentication. In another example, the computer program product may have a fourth executable portion for fusing the individual bit location error rates into an overall bit error rate for the potentially distorted copies and then verifying the presence of the watermark based on the difference of the overall bit error rate to 0.5. Or the verification of the presence of the watermark may be based on the difference between the lowest individual bit location error rate to 0.5.

In another exemplary embodiment, an apparatus for authenticating digital signals is provided. The apparatus includes a receiving element, an extracting element, and a reconstruction element. The receiving element is configured to receive a digital signal. The extracting element is configured to retrieve potentially distorted copies of a received watermark from the digital signal. Each potentially distorted copy includes a plurality of extracted values. The reconstruction element is configured to estimate one or more individual bit location error rates for the potentially distorted copies and to reconstruct a plurality of original values of the received watermark based on the individual bit location error rates and the plurality of extracted values from the potentially distorted copies. The apparatus may further include a correlation element for determining the correlation between the reconstructed original values of the received watermark to a plurality of values of an original watermark.

In another exemplary embodiment, a system is provided that includes the aforementioned apparatus as well as a second apparatus. The second apparatus may include an embedding element for inserting a plurality of copies of an original watermark into a host digital signal. The embedding element may be configured to insert the copies of the original watermark uniformly throughout the host digital signal. Also, the embedding element may insert the copies of the original watermark in a spatial domain or a transform domain of the host digital signal. Although the system of this exemplary embodiment may comprise two separate apparatuses, according to another exemplary embodiment the functions and elements of both of these apparatuses are found in one apparatus.

Reconstructing a potentially distorted watermark based exclusively from a plurality of extracted copies of one type of watermark and without the need of additional training or reference information may be beneficial. For example, the watermarked signal according to embodiments of the present invention may be smaller compared to conventional watermark signals that must carry both robust watermarks and reference watermarks. Also, embodiments of the present invention do not rely on the assumption that the bit error rate for one type of watermark is the same as the bit error rate for a second type of watermark. Therefore, embodiments of the present invention may be less susceptible to localized distortions that may affect one type of watermark more than another type of watermark.

Verifying the presence of a watermark without knowing the value of the original watermark may be beneficial. For example, without basing the verification on original values of the watermark, the value of the watermark, at the transmitting end, may be changed frequently without having the need to convey the new watermark to the extractor each time the watermark is changed.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

Figure 1:
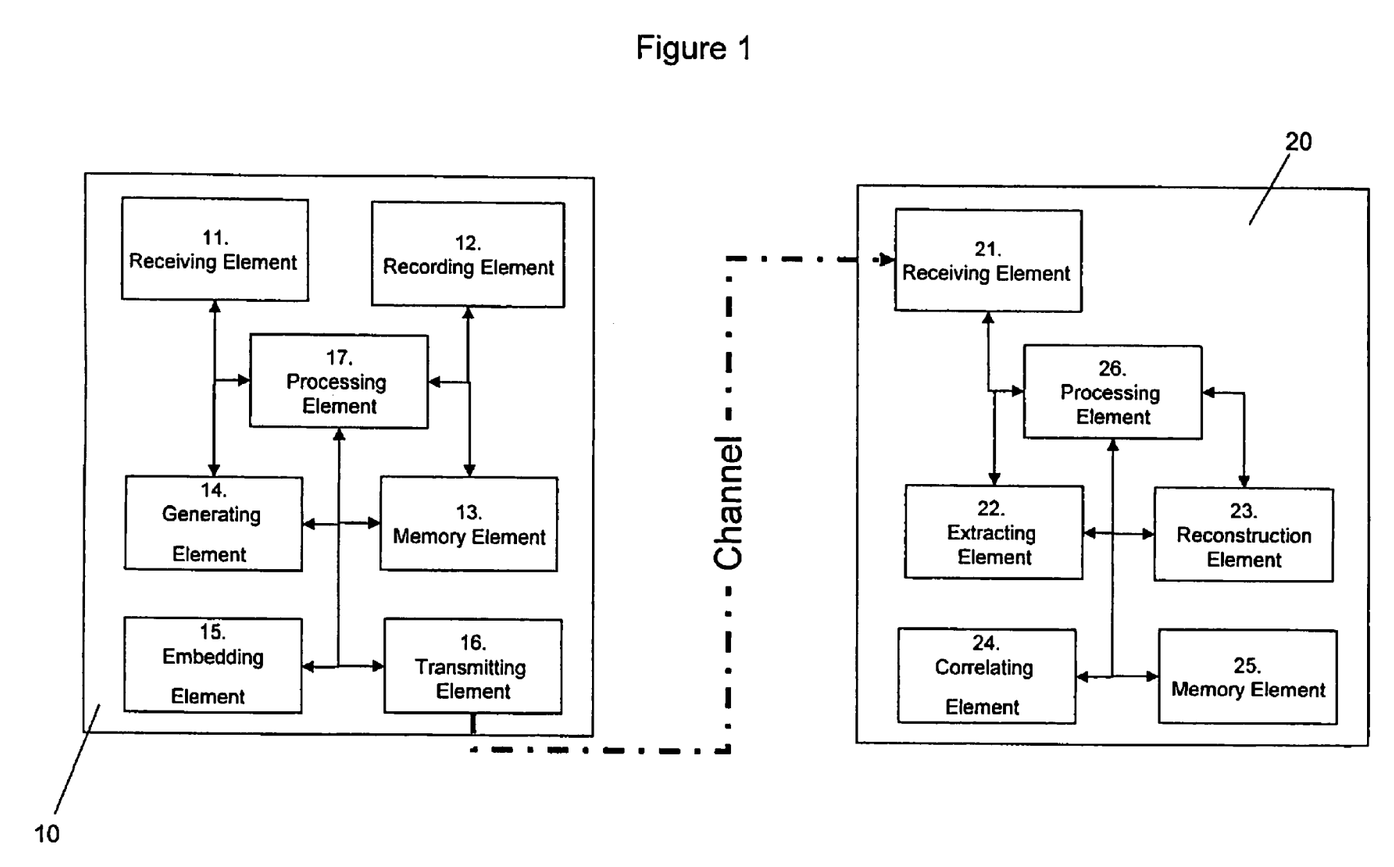
FIG. 1 illustrates the elements of a first device and a second device according to an embodiment of the present invention.

Embodiments of the present invention relate to the authentication of digital data. As shown in FIG. 1, an authentication process may involve two primary devices. The first device 10 is for creating or receiving an original data set and embedding or inserting an authentication code into the original data set. The second device 20 is for receiving a data set and extracting or reading an authentication code embedded within the received data set and determining whether the received data set is the original data set. Although described as a first device 10 and second device 20, one in the art would appreciate that the first and second device are not necessary two independent devices but may be one device or one system that includes the components and functions of both the first and second devices described herein.

The first device creates or receives the digital data set. The digital data set may be in the form of a digital file or signal and represent audio content (speech and music), images (photographs, graphics, drawings), video content, or other digital content. The first device may be a computer or communication device configured to receive digital data. For example, the first device may be a desktop computer, a laptop computer, a server, a mobile telephone, a portable digital assistant, or other type of portable or stationary computer or communication device and include all necessary software, controllers, memory devices, connections, antennas, modems, disk drives, and other accessories to operate such devices. The manner in which the first device receives the digital data may vary. For example, the first device may receive the digital data set through a network, such as the Internet or an intranet, as an electronic mail, or in accordance with other downloading formats or processes. The first device may be capable of creating a digital data set instead of or in addition to receiving the digital data set. For example, the first device may include a recording element such as a digital camera, video recorder, voice or sound recorder, or scanner for creating the digital data set and the necessary software and accessories to operate such elements.

The first device is also configured to insert or embed an authentication code into the digital data set. As such, the first device includes all the necessary hardware and software, including programs, computer readable memory devices, and controllers for processing and embedding the authentication code into the digital data set. The first device may be configured to generate authentication codes for insertion and/or receive authentication codes from an outside source for insertion. The authentication code is in the form of a digital watermark. The digital watermark is a sequence of bits that may represent ownership, origin, copyright, or other information regarding the digital data set. Multiple copies of the watermark are inserted into the digital data set. The insertion strategy, i.e. the placement of the copies throughout the digital data set, may vary including inserting the copies in either a spatial domain or in a transform domain, such as discrete cosine transform coefficients or wavelet coefficients. In general, the insertion strategy is to embed the copies such that the copies are "hidden", i.e. they have little or no perceptible impact on the digital data set. For example, in a digital data set that represents an image the copies of the watermark may be embedded through the least significant bit(s) of a number of pixels of the image such that the copies of the watermark have little or no perceptible impact on the quality of the image. By hiding the copies of the watermark, the watermark does not mar the image and makes it harder for potential attackers to detect or locate the copies of the watermark in effort to remove or distort them.

According to the illustrated embodiment of FIG. 1, the first device 10 includes a receiving element 11, such as an antenna, a receiver or other input device, for receiving digital data sets, a recording element 12 for creating digital data sets, a memory element 13 for storing digital data sets, a generating element 14 for generating authentication codes, an embedding element 15 for inserting authentication codes into digital data sets, a transmitting element 16, such as an antenna, a transmitter or other output device, for transmitting the digital data sets with embedded authentication codes, and a processing element 17 configured to regulate or control the functions of the other elements. The processing element may be comprised of a processor or other computing device and may serve not only to regulate or control the functions of the other elements, but may, in fact, serve as one or more of the other elements, such as the recording element, the generating element and/or the embedding element.

As used herein, a "host signal" is the digital data set before the insertion of the copies of the watermark. And a "watermarked signal" is the digital data set after the insertion of the copies of the watermark.

The first device transmits or exports the watermarked signal. For example, the first device either directly or through one or more intermediate devices may present or send the watermarked signal as part of a communication, purchase, license, or general use with or for one or more thirds parties or for internal use. Therefore the first device includes the necessary hardware and software for sending or transmitting the watermarked signal.

During the use and/or transmission of the watermarked signal, the watermarked signal is vulnerable to attacks. An "attack" is typically an action by someone who is intentionally trying to modify the signal such that the watermark in the signal is destroyed or distorted beyond recognition, thus making it harder or impossible to ascertain the true ownership or origin of the watermarked signal. However an attack may also be incidental to a proper or benign use of the signal. Using an image as an example again, an attack may include actions such as cropping, filtering, rotating, and any other action that modifies at least a portion of the watermark within the signal, regardless of the intent behind the action.

The second device is configured to receive one or more digital signals from one or more sources. To that end, the second device may be a desktop computer, a laptop computer, a server, a mobile telephone, a portable digital assistant, or other type of portable or stationary computer or communication device and include all necessary software, controllers, memory devices, connections, antennas, modems, and other accessories to operate such devices and receive the signals. The second device may be configured to receive the signals through a variety of means including but not limited to a network, such as the Internet or an intranet, as an electronic mail, or in accordance with other downloading formats or processes.

The second device is also configured to authenticate the received digital signals. More specifically, the second device is configured to review the received digital signals and determine whether any one of the digital signals is a watermarked signal, i.e. a host signal with the embedded watermark. For example, the second device receives a digital signal, referred to herein for illustrative purposes only as a received digital signal, and determines whether the received digital signal is a host signal with the embedded watermark, i.e. a watermarked signal. As stated above, the watermarked signal has multiple copies of the watermark. Each copy of the watermark is a sequence of bits embedded in the watermarked signal. The second device extracts the data from the received digital signal that corresponds to the location of the multiple copies of the watermark in the watermarked signal. The second device's extraction strategy, i.e., retrieving the copies of the watermark, may be essentially the first device's insertion strategy, i.e., embedding the copies of the watermark into the signal, in reverse. As such, the second device may be advised of the first device's insertion strategy in advance so as to guide its extraction strategy.

The extracted data represents potential copies of the watermark. However, due to potential attacks, the copies of the watermark may have been distorted, and thus the copies may differ than the original watermark that was embedded. One in the art would appreciate the term "channel" to generally refer to the path that the watermarked signal traveled from the first device to the second device. The channel may include one or more intermediate devices that received, processed, stored, and retransmitted the signal until the watermarked signal was received by the second device. The channel may differ for any given signal and differing channels may introduce a different amount of attacks or noise, i.e. distortion, onto the copies of the watermarks. Therefore the second device may not know the extent of which the copies of the watermark have been distorted.

In order to determine whether the distorted copies represent the original watermark, the second device is configured to combine the distorted copies of the watermark by estimating the effects of the distortion on the copies in order to reconstruct the original watermark. The reconstructed watermark is then compared to the original watermark. If the correlation between the reconstructed watermark and original watermark is sufficiently high, then the second device may authenticate the received signal as being the host signal.

According to the illustrated embodiment of the FIG. 1, the second device 20 includes a receiving element 21, such as an antenna, a receiver or other input device, for receiving the digital signals including watermarked signals, an extracting element 22 for extracting possible copies of a watermark from a digital signal, a reconstruction element 23 for estimating the original values of the extracted copies of a watermark 23, a correlation element 24 for authenticating the digital signals, a memory element 25 for storing digital signals and a processing element 26 configured to regulate or control the functions of the other elements. The processing element may be comprised of a processor or other computing device and may serve not only to regulate or control the functions of the other elements, but may, in fact, serve as one or more of the other elements, such as the extracting element, the reconstruction element and/or the correlation element.

Figure 2:
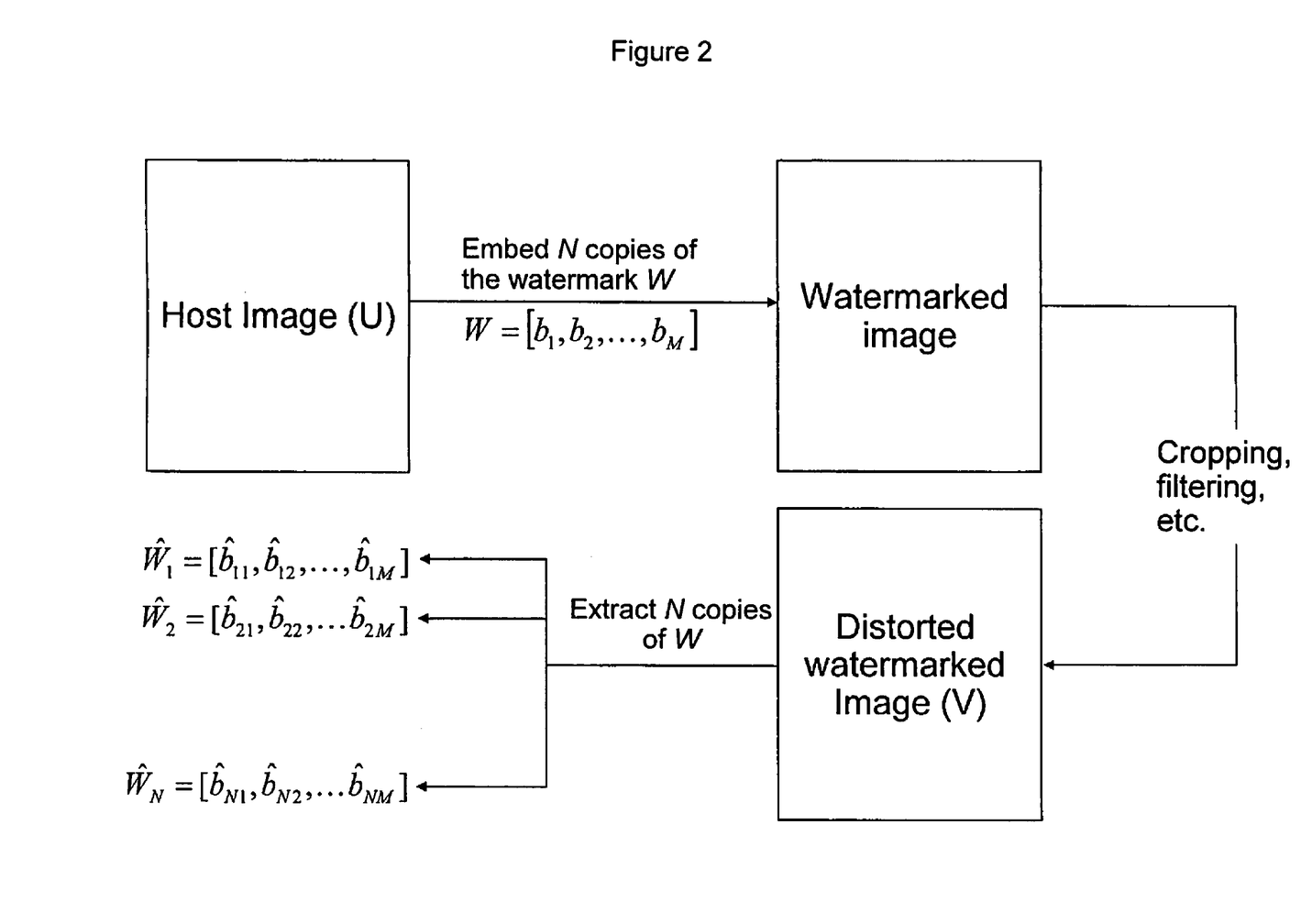
FIG. 2 illustrates a process of embedding and extracting N copies of a watermark according to another embodiment of the present invention.
Figure 3:
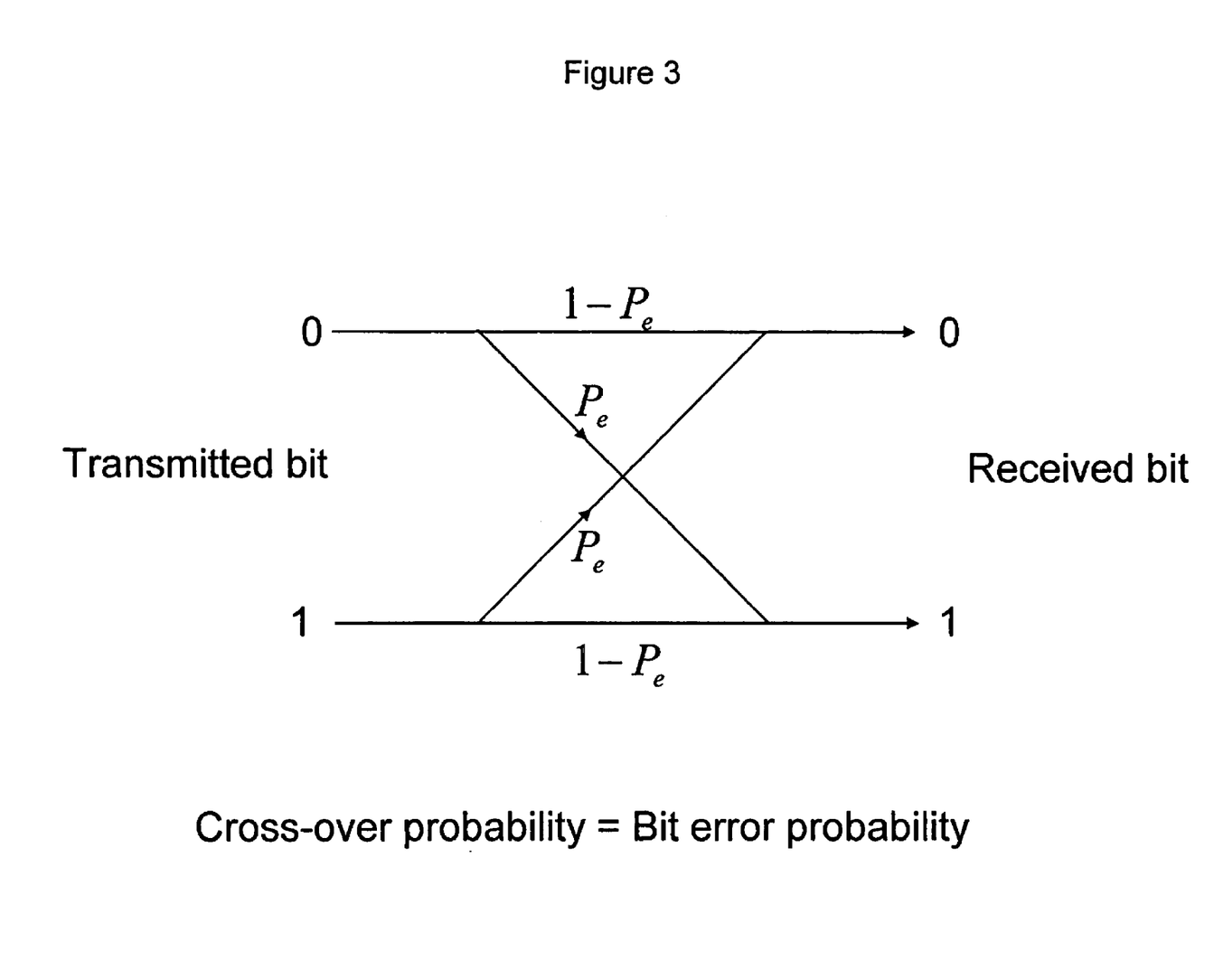
FIG. 3 illustrates a binary symmetric channel with crossover probability $P_e$.
Figure 4:
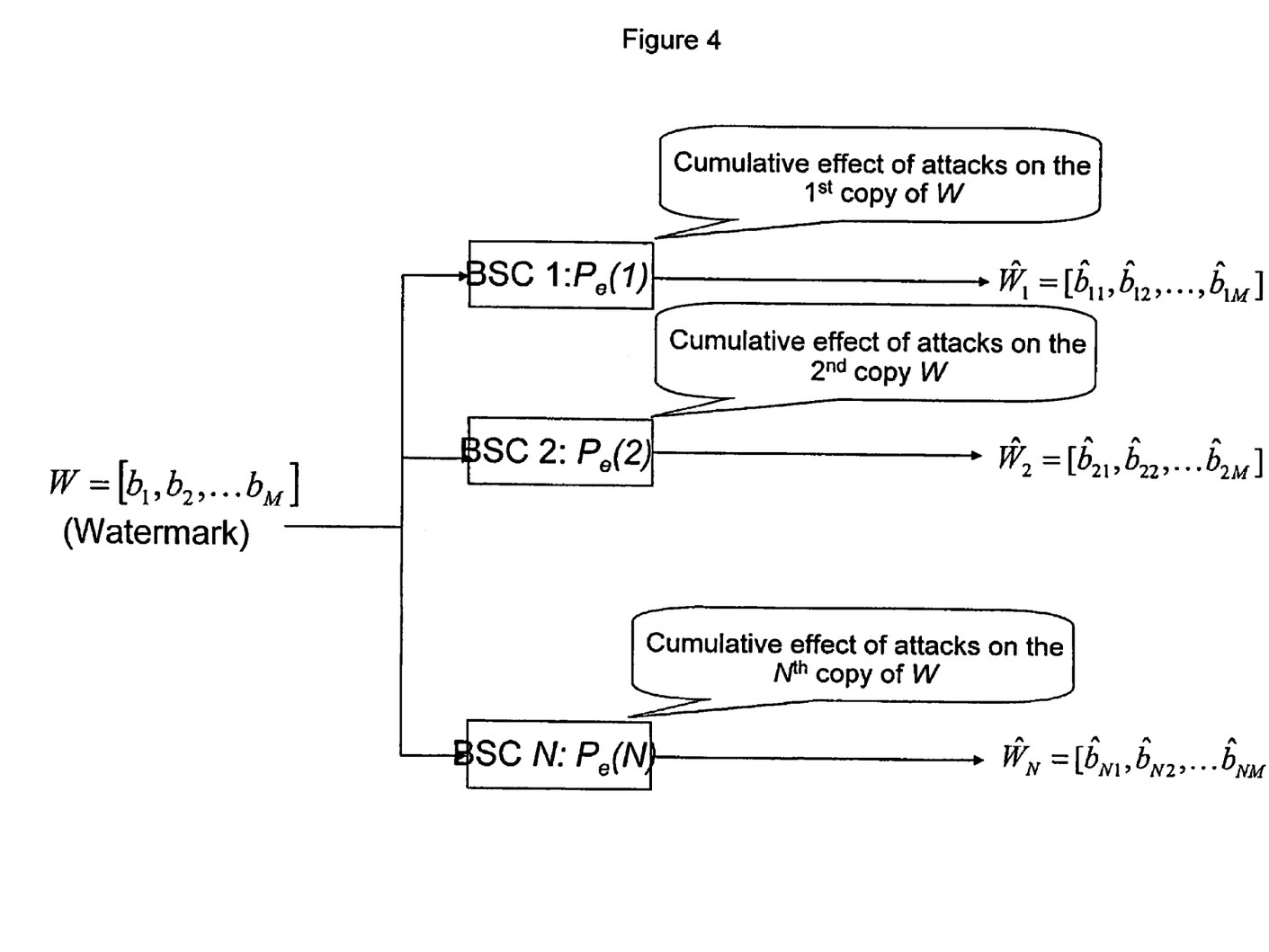
FIG. 4 illustrates attacks on an watermarked image when transmitted through N independent binary symmetric channels.

FIGS. 2-4 illustrate another embodiment of the present invention. For illustration purposes only and as shown in FIG. 2, the host signal of the illustrated embodiment may represent an image, referred to as a host image and represented by a matrix U. The watermark W is a sequence of a predetermined number M of bits b, i.e. W=[$b_1$, $b_2$, . . . $b_M$]. A number N of copies of the watermark W is inserted into the host image, thus creating a watermarked image. The number M of bits that make up the watermark W may vary depending on the application, the amount of information intended to carried by the watermark, and whether the host signal is audio, video, imaginary, etc. Typically, the number N of copies embedded is at least three. The maximum number of copies is usually the number of copies that can be embedded into the image without visibly distorting the image. Moreover, in some embodiments, the copies of the watermark W may be uniformly distributed throughout the image.

Again as illustrated in FIG. 2, the watermarked image may undergo one or more attacks, such as cropping and filtering. As explained above, the attacks may distort, i.e. change or alter, one or more of the copies of watermark. The image containing potentially distorted copies of the watermark is referred to herein as a distorted watermarked image V. Due to the distortions, one or more bits of the individual copies of the watermark may be corrupted, i.e. contain incorrect values or be unreadable. Also different copies of the watermark may have been corrupted differently or to a greater degree than other copies of the watermark, because one or more of the distortions may have had only a localized impact on the image.

The potentially distorted watermark $\hat{W}$ is extracted from the image. Or more specifically, the potentially distorted copies of the watermark are extracted from the image, i.e. $\hat{W}_1$, $\hat{W}_2$, . . . $\hat{W}_N$, wherein $\hat{W}_i=[\hat{b}_{i1}, \hat{b}_{i2}, \ldots, \hat{b}_{iM}]$, i=1, 2, . . . N. The effects of the distortions on the copies of the watermark are modeled as being the equivalent to transmitting each bit location for the copies of the watermark through a number of independent binary symmetric channels (or BSC). The number of binary symmetric channels equals the number of extracted copies of the watermark. As shown in FIG. 3, a binary symmetric channel is defined by its cross-probability or bit error probability $P_e$, which is the probability that the binary symmetric channel will cause a transmitted bit (0 or 1) to be received in error. Equivalently, $1-P_e$ is the probability that the binary symmetric channel will not flip the transmitted bit, i.e., change a 1 to a 0 or, conversely, change a 0 to a 1. Modeling the distortion effects on the copies of the watermark to a set of N independent binary symmetric channels allows for the quantification of a certain probability that the watermark bits were received in error and captures the cumulative effects of all attacks on the watermarked image.

Therefore based on this model, the process of extracting the original watermark W from the potentially distorted copies $\hat{W}_1$, $\hat{W}_2$, . . . $\hat{W}_N$ includes estimating the original value for each bit of the watermark, of which N copies have been received via N independent binary symmetric channels as shown in FIG. 4 and wherein the cross-over probabilities of the binary symmetric channels are unknown. The cross-over probability of the $i^{th}$ binary symmetric channel is denoted by $P_e(i)$, i=1, 2, . . . , N. The $m^{th}$ watermark bit can be optimally reconstructed from $\hat{W}_i=[\hat{b}_{i1}, \hat{b}_{i2}, \ldots, \hat{b}_{iM}]$, i=1, 2, . . . N using the following formula (referred to herein as equation (1)):

$$\sum_{i=1}^{N} (1-2\hat{b}_{im})\ln\left(\frac{P_e(i)}{1-P_e(i)}\right) \begin{matrix} b_m=1 \\ > \\ < \\ b_m=0 \end{matrix} 0; m=1, 2, \ldots, M$$

Because the cross-over probabilities of the binary symmetric channels are unknown, the cross-over probabilities are estimated. Specifically for equation (1), $P_e(i)$ is replaced by $\hat{P}_e(i)$, the estimate of $P_e(i)$. Therefore the formula becomes (referred to herein as equation (2)):

$$\sum_{i=1}^{N} (1-2\hat{b}_{im})\ln\left(\frac{\hat{P}_e(i)}{1-\hat{P}_e(i)}\right) \begin{matrix} b_m=1 \\ > \\ < \\ b_m=0 \end{matrix} 0; m=1, 2, \ldots, M$$

One of the features of some of the embodiments of the present invention is estimating the cross-over probabilities exclusively from the potentially distorted copies of the watermark and without any training or reference information, such as reference watermarks. In other words, the original values for the potentially distorted copies of the watermark are reconstructed blindly, also referred to as blind fusion, by using the extracted values from only the potentially distorted copies of the watermarks, i.e. $\hat{W}_i=[\hat{b}_{i1}, \hat{b}_{i2}, \ldots, \hat{b}_{iM}]$, i=1, 2, ... N. The estimation algorithm for estimating the original values blindly, i.e. without training or reference information, may vary. For example, in one embodiment of the present embodiment, $\hat{P}_e(i)$ may be obtained with the following estimation algorithm:

1. Compute $\hat{p}_{12}, \hat{p}_{13}, \ldots, \hat{p}_{1N}$, $$\hat{p}_{23} \text{ where } \hat{p}_{ij} = \frac{(\# \text{ of bit locations where } \hat{W}_i = \hat{W}_j)}{M}$$

2. Using $\hat{p}_{12}, \hat{p}_{13}, \ldots, \hat{p}_{1N}, \hat{p}_{23}$, estimate of the cross-over probability of the N BSCs as $$\hat{P}_e(1) = \frac{1}{2} - \frac{1}{2}\sqrt{\left|\frac{(2\hat{p}_{12}-1)(2\hat{p}_{13}-1)}{2\hat{p}_{23}-1}\right|}$$

$$\hat{P}_e(i) = \frac{1-\hat{p}_{1i}-\hat{P}_e(1)}{1-2\hat{P}_e(1)}; i=2,3,\ldots,N$$

The estimated cross-over probabilities along with the bits of the N extracted copies of the watermark may be applied to equation (2) for reconstructing the watermark, referred to as the "reconstructed watermark."

For example purposes only, a digital host signal may have three copies of an original watermark W, i.e. N=3. The original watermark W may be a 3-bit sequence of [110], i.e. $b_1=1$, $b_2=1$, and $b_3=0$. However, in the received digital host signal the copies of the watermark are distorted. Specifically, in this example, the extracted copies have the following values, $\hat{W}_1=[111]$, $\hat{W}_2=[101]$ and $\hat{W}_3=[011]$. Therefore using the estimation algorithm disclosed above, $\hat{p}_{12}, \hat{p}_{13}, \ldots \hat{p}_{1N}, \hat{p}_{23}$ are computed as: $\hat{p}_{12}=\tfrac{2}{3}$ (i=1, j=2), $\hat{p}_{13} = 2/3 (i=1, j=3)$ and $\hat{p}_{23} = 1/3 (i=2, j=3)$;

$\hat{P}_e(1)$ is computed as $$\hat{P}_e(1) = \frac{1}{2} - \frac{1}{2}\sqrt{\left|\frac{((2)(2/3)-1)((2)(2/3)-1)}{(2)(1/3)-1}\right|} = 0.2113;$$

$\hat{P}_e(2)$ is computed as:

$$\hat{P}_e(2) = \frac{1-0.6667-0.2113}{1-2(0.2113)} = 0.2113; \text{ and } \hat{P}_e(3) \text{ is computed as:}$$

$$\hat{P}_e(3) = \frac{1-0.6667-0.2113}{1-2(0.2113)} = 0.2113.$$

In yet another embodiment of the present invention $\hat{P}_e(i)$ may be obtained by another estimation algorithm including by not limited to the modified power method procedure disclosed in A. Dixit, S. C. Douglas and G. C. Orsak, "Blind Estimation of Channel BERs in a Multi-Receiver Netowrk", Proc. IEEE International Conf. on Acoustics, Speech, and Signal Processing, Montreal, Canada, May 2004, which is hereby incorporated by reference. According to this procedure, the bit error rates (or BERs) for each bit location, also referred to as individual bit location error rates, can be estimated based on N copies of the watermark by solving the following set of N(N−1)/2 equations in N unknowns to yield estimates of $\hat{P}_e(1), \hat{P}_e(2), \ldots, \hat{P}_e(N)$.

$$1 - \hat{P}_e(1) - \hat{P}_e(2) + 2\hat{P}_e(1)\hat{P}_e(2) = \hat{p}_{12}$$
$$1 - \hat{P}_e(1) - \hat{P}_e(3) + 2\hat{P}_e(1)\hat{P}_e(3) = \hat{p}_{13}$$
$$\vdots$$
$$1 - \hat{P}_e(1) - \hat{P}_e(N) + 2\hat{P}_e(1)\hat{P}_e(N) = \hat{p}_{1N}$$
$$1 - \hat{P}_e(2) - \hat{P}_e(3) + 2\hat{P}_e(2)\hat{P}_e(3) = \hat{p}_{23}$$
$$1 - \hat{P}_e(2) - \hat{P}_e(4) + 2\hat{P}_e(2)\hat{P}_e(4) = \hat{p}_{24}$$
$$\vdots$$
$$1 - \hat{P}_e(N-1) - \hat{P}_e(N) + 2\hat{P}_e(N-1)\hat{P}_e(N) = \hat{p}_{N-1N}$$

P is the column vector of individual bit location error rates defined as $P=[\hat{P}_e(1), \hat{P}_e(2), \ldots, \hat{P}_e(N)]^T$ and $\overline{P}=1_N-P$ where $1_N$ denotes an N long column vector of ones. Therefore $\overline{P}$ is an eigenvector of the matrix $\overline{PP^T}$, corresponding to the eigenvalue $\|\overline{P}\|^2$. Moreover, it can be shown that $\|\overline{P}\|^2$ is the only non-zero eigenvalue of the matrix $\overline{PP^T}$.

L is a N×N real symmetric matrix with eigenvalues $\lambda_i$, i=1, 2, ..., N such that $|\lambda_1|>|\lambda_2|\geq|\lambda_N|$. Then given $v_0 \in R^N$, the power method produces a sequence of vectors as follows:

```
for i := 0,1,2...do
    v_i = Lv_i
    v_{i+1} = v_i/||v_i||^2
end
```

The sequence of vectors $v_i$ converges to the dominant eigenvector of L if the initial vector $v_0$ has a component in the direction of the dominant eigenvector and the rate of convergence is dictated by $|\lambda_2|/|\lambda_1|$.

Based on the power method, P can be estimated as the dominant eigenvector to the matrix $\overline{PP^T}$. Because the matrix $\overline{PP^T}$ is unknown the matrix $\overline{PP^T}$ is approximated. For example, consider another matrix A constructed from the N(N−1)/2 statistics $\hat{p}_{ij}$ as follows:

$$\begin{bmatrix} 0 & \hat{p}_{12} & \hat{p}_{13} & \cdots & \hat{p}_{1N} \\ \hat{p}_{12} & 0 & & \cdots & \hat{p}_{2N} \\ \hat{p}_{13} & \hat{p}_{23} & 0 & \cdots & \hat{p}_{3N} \\ \vdots & & & \ddots & \\ \hat{p}_{1N} & \hat{p}_{2N} & \cdots & \cdots & 0 \end{bmatrix}$$

Given infinite length of the watermark and hence, error free estimates $\hat{p}_{ij}$, the matrix A can be decomposed as $A=PP^T + \overline{PP^T} - \text{diag}(PP^T + \overline{PP^T})$ (referred to herein as equation 3), where diag(•) denotes a diagonal matrix with the diagonal equal to the diagonal of the argument matrix. Equation 3 may be applied to approximate $\overline{PP^T}$ for finite observations and derive the power method based iterations to estimate P as follows:

Initialization:

$\overline{P}_0 = 1_N$ $P_0 = 1_N - \overline{P}_0$

Iterations:

for $i = 0, 1, 2 \ldots$ do

-continued $$\overline{P}_{i+1} = [A + diag(P_i P_i^T + \overline{P}_i \overline{P}_i^T) - P_i P_i^T] \frac{P}{\|\overline{P}_i\|^2}$$

$$P_{i+1} = 1 - \overline{P}_{i+1}$$

end

The desired solution for this procedure is a stable point of the algorithm i.e. if the iterations converge to the desired solution (error-free value of P), the error in the subsequent iterations is zero.

One in the art should appreciate that the two above estimation algorithms are for illustrative purposes only and that other estimation algorithms may be employed to obtain $\hat{P}_e(i)$.

As previously stated, if correlation between the reconstructed watermark and the original watermark is sufficient high then the retrieved image may be authenticated as the host image. The level of correlation for authentication may vary depending on the application, type of signal (e.g., audio, video, or image) and type of watermark (e.g., logo of a company, trademark or just random bit sequence) and also on how much certainty is desired when determining whether the watermark is present or absent. An exemplary value may be a correlation=0.95 or be set at any value between greater than 0 to 1.

Figure 5:
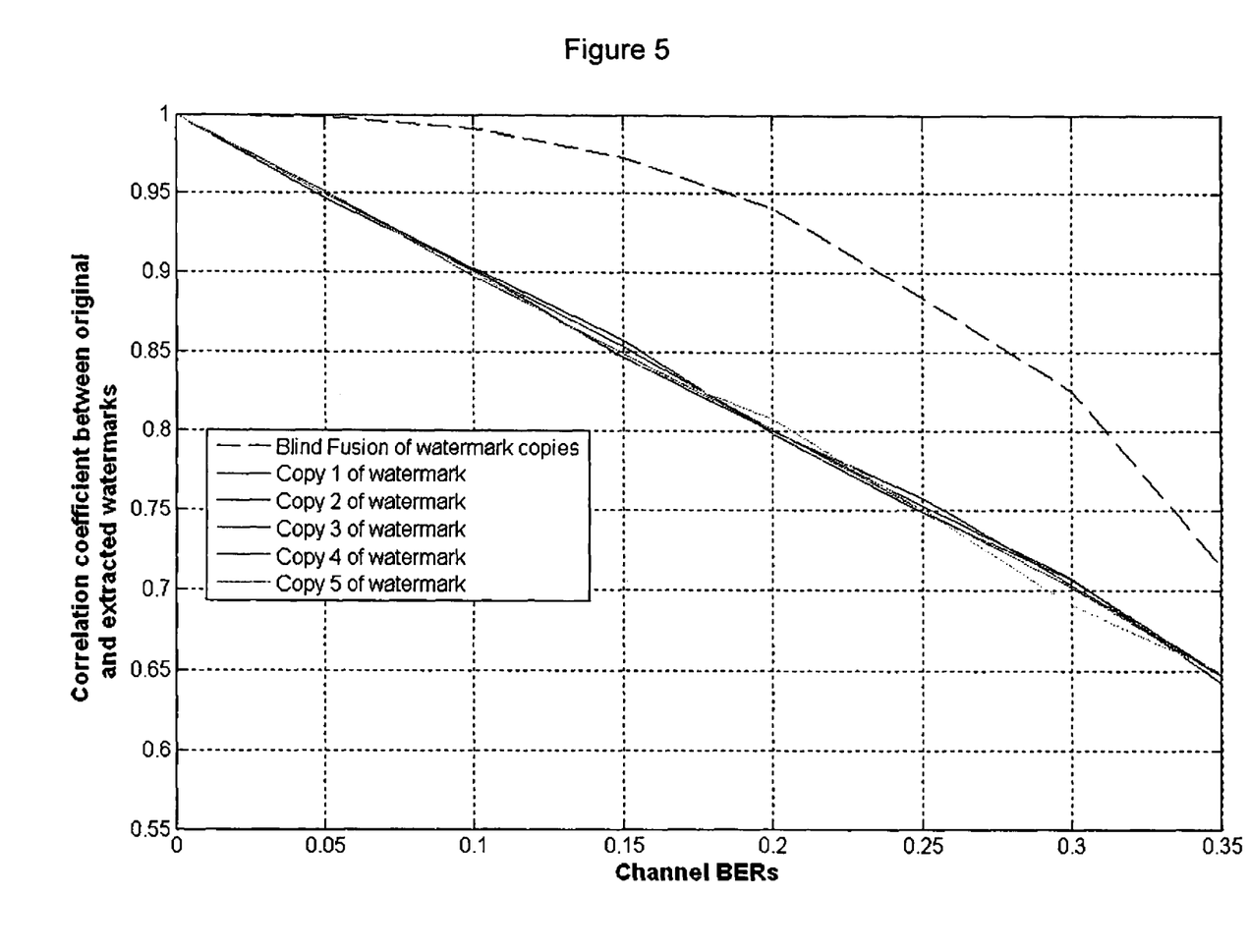
FIG. 5 is a chart comparing the correlation between individual extracted copies of a watermark and an original watermark and the correlation between a blindly fused reconstructed watermark and the original watermark.

Reconstructing the extracted watermark through the blind fusion of multiple and potentially distorted copies allows for higher correlation between the reconstructed watermark and the original watermark than compared to correlating an individual extracted copy of the watermark and the original watermark. For example, five copies of a 512 bit long, randomly generated watermark were embedded in a 512 pixel× 512 pixel Lenna image. The watermarked image was corrupted by additive noise such that the bit error rate for the image was varied from 0 (no noise) to 0.35 (on an average, 35% of the watermark bits were in error). It can be seen from FIG. 5 that the correlation between the blindly fused watermark and the original watermark is much higher than the correlation between the individual received copies of the watermark and the original watermark. Hence, employing blind fusion of copies of the watermark achieves a higher degree of robustness.

Figure 6:
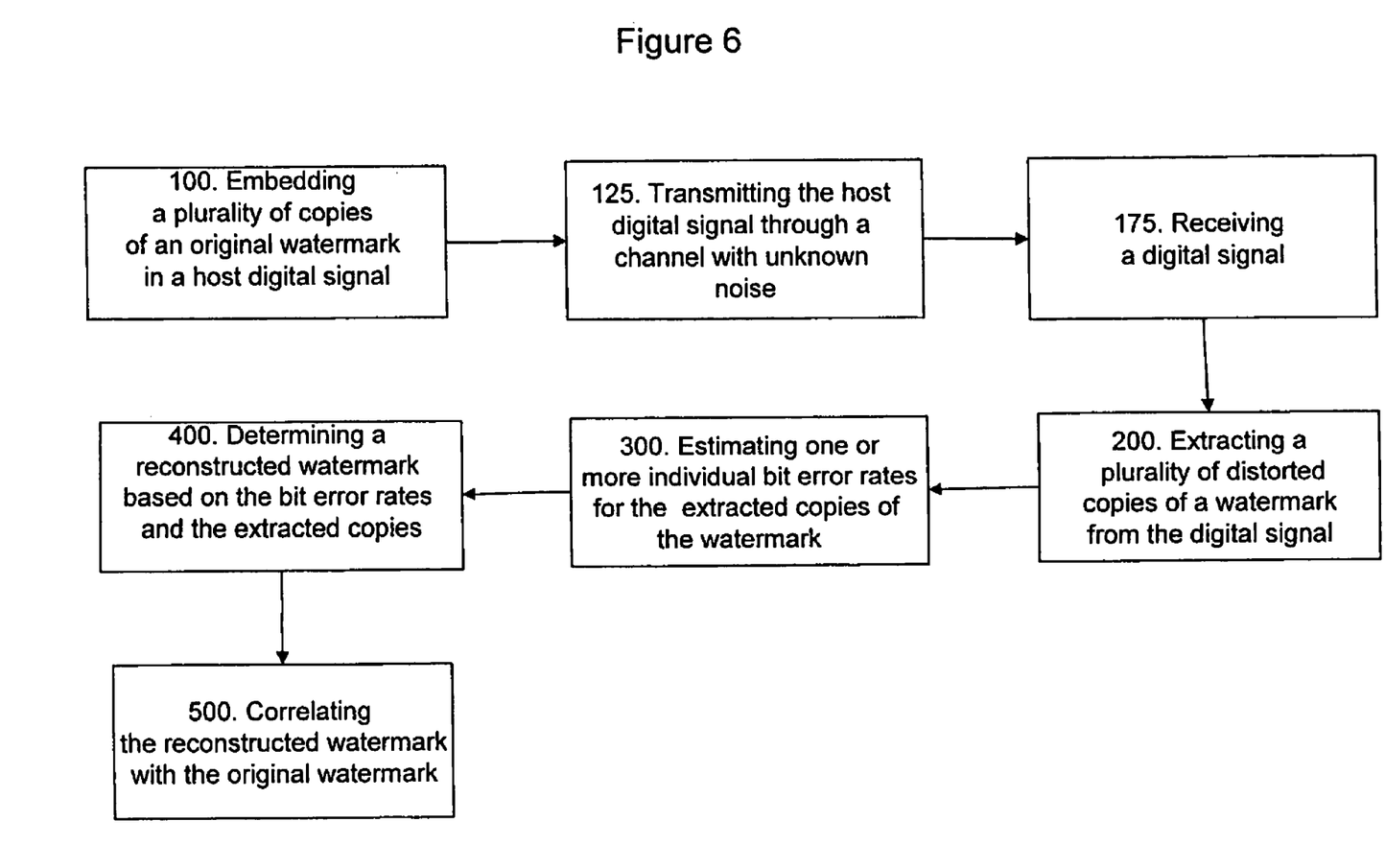
FIG. 6 illustrates a method according to yet another embodiment of the present invention.

FIG. 6 illustrates a method according to an embodiment of the present invention. The method includes extracting 200 more than one potentially distorted copy of a watermark from a digital signal, estimating 300 one or more individual bit location error rates for the potentially distorted copies based exclusively upon the potentially distorted copies and without the use of training or reference data, and then determining 400 a reconstructed watermark based on the individual bit location error rates and the potentially distorted copies of the watermark. As explained above, an individual bit location error rate may be estimated by modeling the individual bit location error rate as being the equivalent to transmitting the copies of the watermark through a number of independent binary symmetric channels equal to the number of copies of the watermark. As illustrated the method may also include embedding 100 more than one copy of an original watermark into a digital signal and correlating 500 the reconstructed watermark to the original watermark for authentication. Also as illustrated the method may include intermediate steps between embedding the copies and extracting the copies. More specifically, the method may further include transmitting 125 the embedded signal and receiving 175 the embedded signal. The signal is transmitted through a channel within an unknown level of noise or attacks.

Figure 7:
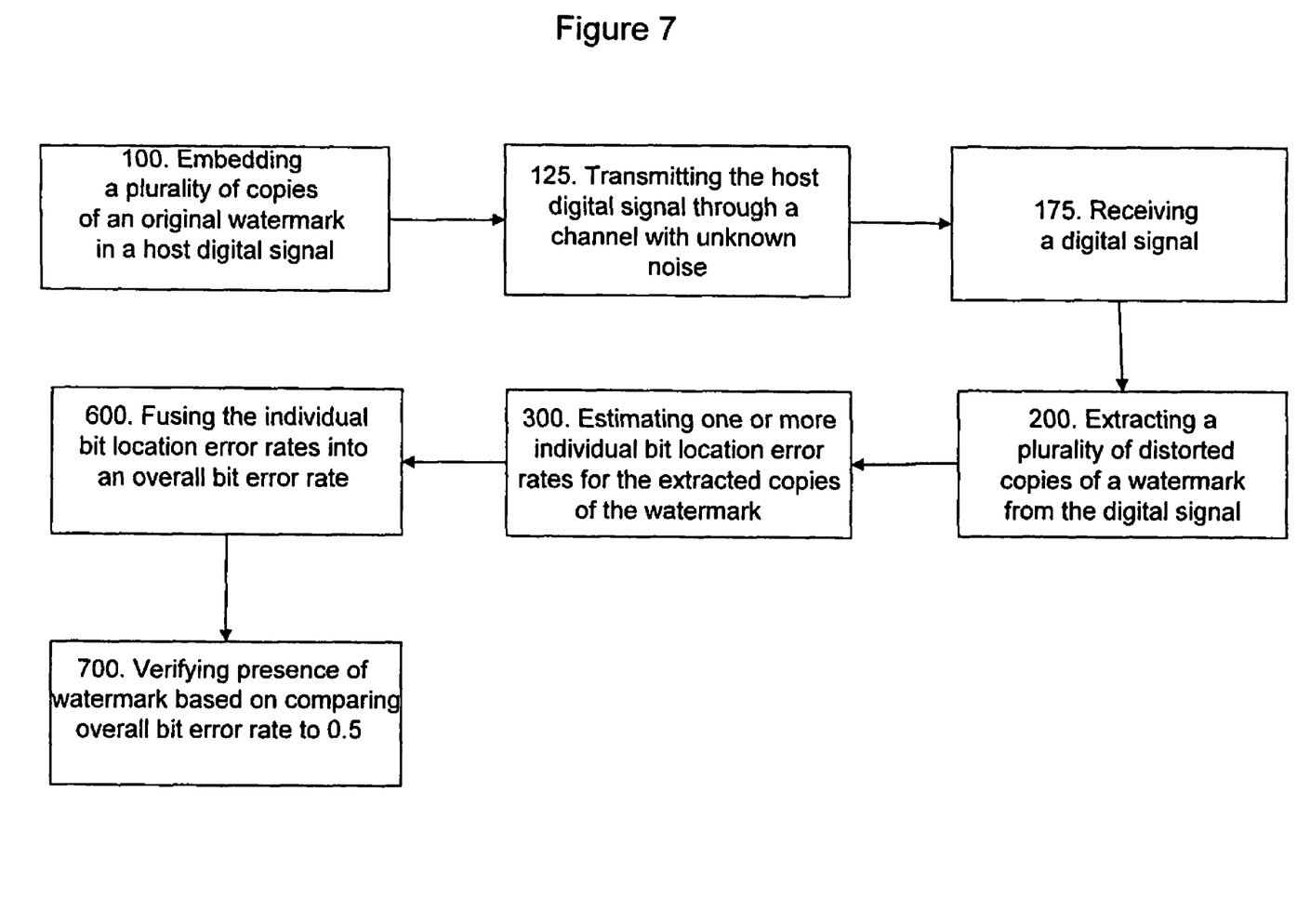
FIG. 7 illustrates a method according to another embodiment of the present invention.

In general, some of the above embodiments pertain to applications where the original watermark is known at the time of extraction. However, embodiments of the present invention may also apply to applications where the value of the original watermark is unknown at the time of extraction. More specifically, embodiments of the present invention may detect the presence a watermark within a digital signal without knowing the original values of the watermark. As an example and as illustrated in FIG. 7, a method is provided that includes extracting 200 copies of a potential watermark, i.e. sequences of bits, from a received digital signal. The extraction is based on the pre-determined locations within the digital signal that would represent copies of the watermark if the received digital signal is a host signal, i.e. a signal with an embedded watermark. Therefore only the locations of the copies are utilized and the original values of the watermark are unnecessary. The method also includes estimating 300 one or more individual bit location error rates of the potential copies of the watermark as described above. In general, randomly selected bits should have a bit error rate close to 0.5. Therefore if the extracted bits do represent multiple copies of a watermark, then the bit error rate should be significantly different than 0.5. The greater the difference between the estimated bit error rates and 0.5, the more likely the extracted bits are not random to each other and represent copies of the watermark. The method may include a step of verifying 700 the presence of the watermark within the digital watermark based on the differences between the estimated bit error rates and 0.5.

Similar to the correlation level described above, the level of difference needed to verify or authenticate the presence of the watermark may vary depending on the application, type of signal (e.g., audio, video, or image) and type of watermark (e.g., logo of a company, trademark or just random bit sequence) and also on how much certainty is desired when determining whether the watermark is present or absent. For example purposes only, the critical level of difference may be 0.3. Therefore, according to this example, if the bit error rates are equal to or greater than 0.8 or are equal to or less than 0.2 then the device or software system would confirm the presence of the watermark in the signal.

More specifically, the individual bit location error rates may be fused 600 to compute an overall bit error rate for the copies of the watermark, which is compared to the critical level of difference. The fusion of the individual bit location error rates into an overall fused bit error rate may be accomplished by running exhaustive simulations. For example, in an application with three copies of a watermark the individual bit location error rates may be 0.05, 0.1, and 0.15, running exhaustive simulations may calculate the overall bit error rate as 0.026, i.e. about half of the best individual bit location error rate, by combining simulated copies of the watermark with the individual bit location error rates.

Also, in other embodiments of the present invention, rather than fusing the individual bit location error rates into an overall bit error rate and then comparing the overall bit error rate to 0.5, the verification may be based on comparing the lowest individual bit location error rate to 0.5.

Authenticating the presence of the watermark without the original values of the watermark allows the values of the watermarks to be changed frequently at the insertion end without requiring the transmission or storage of the frequently changing values of the watermark.

The above described functions may be carried out in many ways. Any suitable means for carrying out each of the functions described above may be employed to carry out the invention. In one embodiment, all or a portion of the elements of the invention generally operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium, such as the memory element of the first and/or second device(s).

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
    extracting a plurality of potentially distorted copies of a watermark from a digital signal, wherein the digital signal does not comprise a reference watermark;
    estimating, by a processor, one or more individual bit location error rates for the potentially distorted copies based exclusively upon the potentially distorted copies; and
    verifying the presence of the watermark in the digital signal based at least in part on a comparison between a predefined threshold and a bit error rate determined based at least in part on at least one of the individual bit location error rates.

2. A method according to claim 1, wherein estimating the individual bit location error rates includes modeling the individual bit location error rates as being equivalent to transmitting the plurality of potentially distorted copies of the watermark through a plurality of independent binary symmetric channels.

3. A method according to claim 2, wherein the number of independent binary symmetric channels is equal to the number of potentially distorted copies.

4. A method according to claim 1, further including fusing two or more the individual bit location error rates into an overall bit error rate for the potentially distorted copies of the watermark, wherein the bit error rate determined based at least in part on at least one of the individual bit location error rates comprises the overall bit error rate, and wherein verifying the presence of the watermark is based at least in part on the difference of the overall bit error rate to the predefined threshold.

5. A method according to claim 4, wherein the predefined threshold comprises 0.5.

6. A method according to claim 1, wherein the bit error rate determined based at least in part on at least one of the individual bit location error rates comprises the lowest individual bit location error rate, and wherein verifying the presence of the watermark is based at least in part on the difference between the lowest individual bit location error rate to the predefined threshold.

7. A method according to claim 6, wherein the predefined threshold comprises 0.5.

8. A method according to claim 1 further comprising determining a reconstructed watermark based on the individual bit location error rates and the plurality of potentially distorted copies of the watermark.

9. A method according to claim 8, wherein the verifying the presence of the watermark is further based on the correlation of the reconstructed watermark to an original watermark.

10. A method according to claim 1 further comprising embedding a plurality of copies of an original watermark into a digital signal.

11. A method according to claim 10, wherein the plurality of copies of the original watermark are uniformly distributed throughout the digital signal.

12. A method according to claim 10, wherein the digital signal represents an image and the plurality of copies of the original watermark are hidden within the image.

13. A computer program product comprising at least one tangible computer-readable storage medium having computer-readable program instructions stored therein, the computer-readable program instructions comprising:
    program instructions configured to extract a plurality of potentially distorted copies of a watermark from a digital signal, wherein the digital signal does not comprise a reference watermark;
    program instructions configured to estimate one or more individual bit location error rates for the potentially distorted copies based exclusively upon the potentially distorted copies; and
    program instructions configured to verify the presence of the watermark in the digital signal based at least in part on a comparison between a predefined threshold and a bit error rate determined based at least in part on at least one of the individual bit location error rates.

14. A computer program product according to claim 13, wherein the program instructions configured to estimate are configured to estimate the individual bit location error rates by modeling the individual bit location error rates as being equivalent to transmitting the plurality of potentially distorted copies of the watermark through a plurality of independent binary symmetric channels.

15. A computer program product according to claim 14, wherein the number of independent binary symmetric channels is equal to the number of potentially distorted copies.

16. A computer program product according to claim 13, further comprising program instructions configured to fuse two or more of the individual bit location error rates into an overall bit error rate for the potentially distorted copies, wherein the bit error rate determined based at least in part on at least one of the individual bit location error rates comprises the overall bit error rate, and wherein the program instructions configured to verify the presence of the watermark are configured to verify the presence of the watermark based at least in part on the difference of the overall bit error rate to the predefined threshold.

17. A computer program product according to claim 16, wherein the predefined threshold comprises 0.5.

18. A computer program product according to claim 13, wherein the bit error rate determined based at least in part on at least one of the individual bit location error rates comprises the lowest individual bit location error rate, and wherein the program instructions configured to verify the presence of the watermark are configured to verify the presence of the watermark based at least in part on the difference of the lowest bit location error rate to the predefined threshold.

19. A computer program product according to claim 18, wherein the predefined threshold comprises 0.5.

20. A computer program product according to claim 13 further comprising program instructions configured to determine a reconstructed watermark based on the individual bit location error rates and the plurality of potentially distorted copies of the watermark.

21. A computer program product according to claim 20, wherein the program instructions configured to verify the presence of the watermark comprise program instructions configured to verify the presence of the watermark further based on the correlation of the reconstructed watermark to an original watermark for authentication.

22. A computer program product according to claim 13 further comprising program instructions configured to embed a plurality of copies of an original watermark into a digital signal.

23. A computer program product according to claim 22 wherein the plurality of copies of the original watermark are uniformly distributed throughout the digital signal.

24. A computer program product according to claim 22, wherein the digital signal represents an image and the plurality of copies of the original watermark are hidden within the image.

25. An apparatus comprising at least one processor and at least one memory storing computer program code, wherein the at least one memory and stored computer program code are configured to, with the at least one processor, cause the apparatus to at least:
    extract a plurality of potentially distorted copies of a received watermark from a digital signal, wherein the digital signal does not comprise a reference watermark;
    estimate one or more individual bit location error rates for the potentially distorted copies based exclusively upon the potentially distorted copies; and
    verify the presence of the watermark in the digital signal based at least in part on a comparison between a predefined threshold and a bit error rate determined based at least in part on at least one of the individual bit location error rates.

26. An apparatus according to claim 25, wherein the at least one memory and stored computer program code are configured to, with the at least one processor, cause the apparatus to estimate the individual bit location error rates by modeling the individual bit location error rates as being equivalent to transmitting the plurality of potentially distorted copies of the watermark through a plurality of independent binary symmetric channels.

27. An apparatus according to claim 26, wherein the number of independent binary symmetric channels is equal to the number of potentially distorted copies.

28. An apparatus according to claim 25, wherein the at least one memory and stored computer program code are configured to, with the at least one processor, cause the apparatus to determine a reconstructed watermark based on the individual bit location error rates and the plurality of potentially distorted copies of the watermark; and
    wherein the at least one memory and stored computer program code are configured to, with the at least one processor, cause the apparatus to verify the presence of the watermark in the digital signal further based on a correlation between the reconstructed watermark to an original watermark.

29. An apparatus according to claim 25 in combination with a second apparatus comprising:
    an embedding element configured to insert a plurality of copies of an original watermark into a host digital signal.

30. A combination according to claim 29, wherein the embedding element is configured to insert the plurality of copies of the original watermark uniformly throughout the host digital signal.

31. A combination according to claim 29, wherein the embedding element is configured to insert the plurality of copies of the original watermark in a spatial domain.

32. A combination according to claim 29, wherein the embedding element is configured to insert the plurality of copies of the original watermark in a transform domain.

33. A combination according to claim 29, wherein both apparatuses are co-located.

34. An apparatus comprising:
    means for extracting a plurality of potentially distorted copies of a received watermark from the digital signal, wherein each potentially distorted copy includes a plurality of extracted values, and wherein the digital signal does not comprise a reference watermark;
    means for estimating one or more individual bit location error rates for the potentially distorted copies based exclusively upon the potentially distorted copies; and
    means for verifying the presence of the received watermark in the digital signal based at least in part on a comparison between a predefined threshold and a bit error rate determined based at least in part on at least one of the individual bit location error rates.

35. An apparatus according to claim 34, wherein the means for estimating the individual bit location error rates is configured to model the individual bit location error rates as being equivalent to transmitting the plurality of potentially distorted copies of the watermark through a plurality of independent binary symmetric channels that are equal in number to the number of potentially distorted copies.

36. An apparatus according to claim 25, wherein the at least one memory and stored computer program code are configured to, with the at least one processor, cause the apparatus to fuse two or more of the individual bit location error rates into an overall bit error rate for the potentially distorted copies, wherein the bit error rate determined based at least in part on at least one of the individual bit location error rates comprises the overall bit error rate, and wherein the at least one memory and stored computer program code are configured to, with the at least one processor, cause the apparatus to verify the presence of the received watermark at least in part by comparing the difference of the overall bit error rate to the predefined threshold.

37. An apparatus according to claim 36, wherein the predefined threshold comprises 0.5.

38. An apparatus according to claim 34, wherein the means for verifying the presence of the received watermark is configured to reconstruct a plurality of original values of the received watermark based on the individual bit location error rates and the plurality of extracted values from the potentially distorted copies.

39. An apparatus according to claim 38 further comprising correlating means for determining a correlation between the reconstructed original values of the received watermark to a plurality of values of an original watermark.

40. An apparatus according to claim 25, wherein the bit error rate determined based at least in part on at least one of the individual bit location error rates comprises the lowest individual bit location error rate, and wherein the at least one memory and stored computer program code are configured to, with the at least one processor, cause the apparatus to verify the presence of the received watermark at least in part by comparing the difference of the lowest individual bit location error rate to the predefined threshold.

41. An apparatus according to claim 40, wherein the predefined threshold comprises 0.5.

* * * * *

UNITED STATES PATENT AND TRADEMARK OFFICE
CERTIFICATE OF CORRECTION

| | |
|---|---|
| PATENT NO. | : 8,077,904 B2 |
| APPLICATION NO. | : 11/479683 |
| DATED | : December 13, 2011 |
| INVENTOR(S) | : Dixit |

It is certified that error appears in the above-identified patent and that said Letters Patent is hereby corrected as shown below:

<u>Column 13,</u>

Line 45, after "two or more", insert --of--.

Signed and Sealed this

Thirteenth Day of November, 2012

David J. Kappos
*Director of the United States Patent and Trademark Office*